May 18, 1965 W. D. JOHNSON 3,183,551
AIR-OPERATED STRIPPER FOR MOLDS
Filed April 14, 1961 4 Sheets-Sheet 2
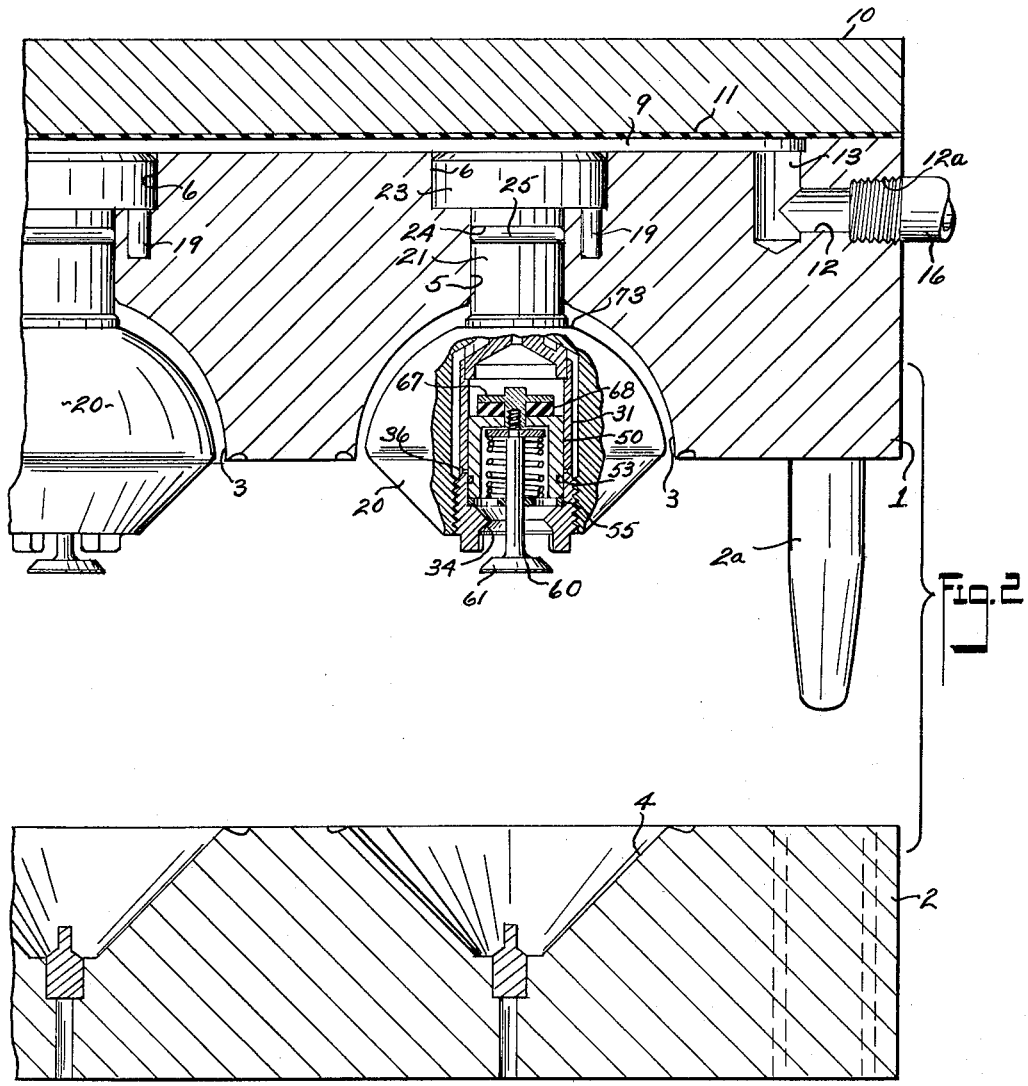
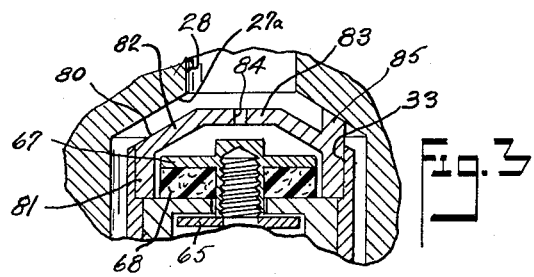
INVENTOR.
WALTER DELMAR JOHNSON
BY
Meyer, Baldwin, Doran & Young
ATTORNEYS

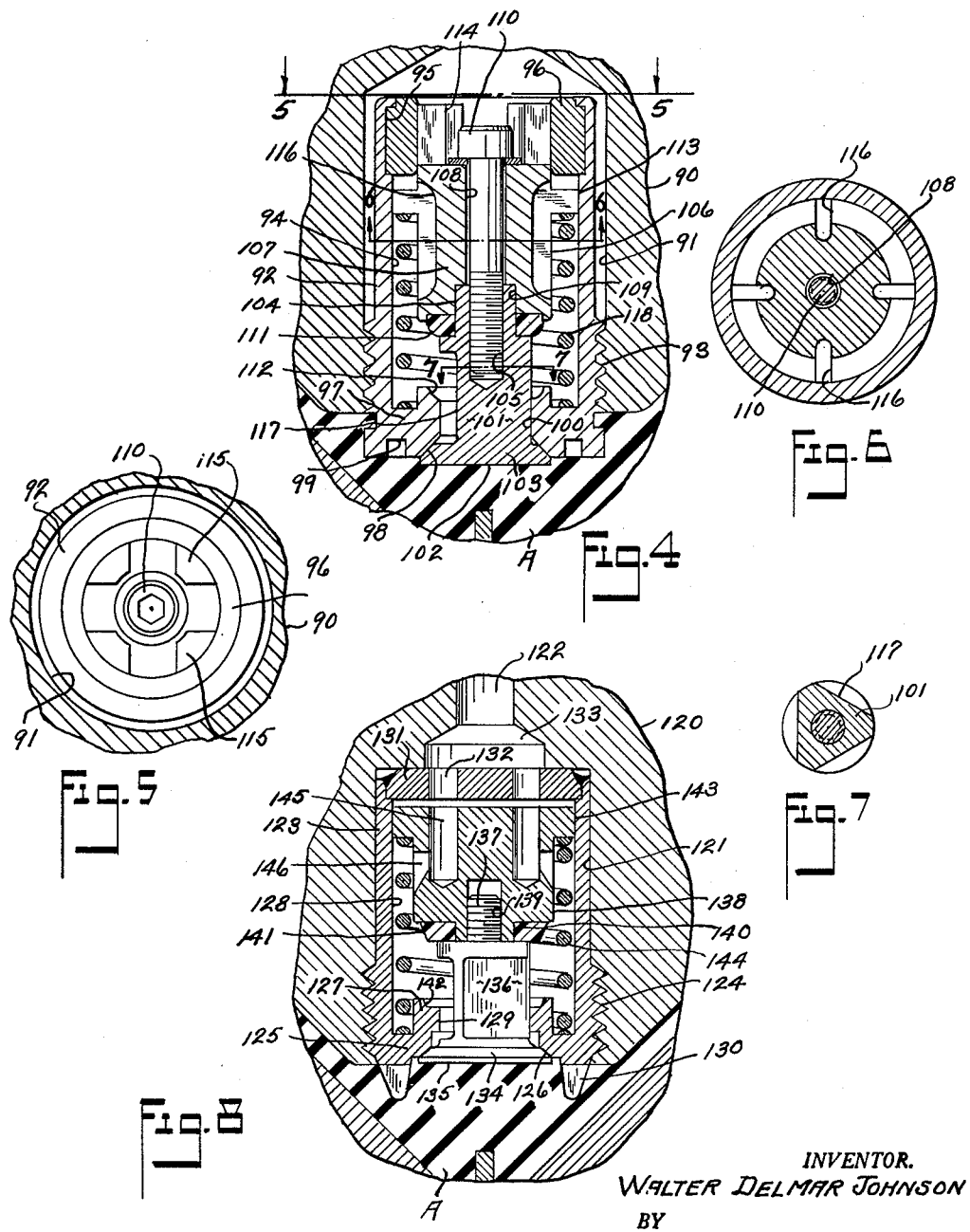

May 18, 1965     W. D. JOHNSON     3,183,551
AIR-OPERATED STRIPPER FOR MOLDS
Filed April 14, 1961     4 Sheets-Sheet 4

INVENTOR.
WALTER DELMAR JOHNSON
BY
ATTORNEYS

United States Patent Office 3,183,551
Patented May 18, 1965

3,183,551
AIR-OPERATED STRIPPER FOR MOLDS
Walter Delmar Johnson, 2502 Noble Road,
Cleveland, Ohio
Filed Apr. 14, 1961, Ser. No. 102,970
12 Claims. (Cl. 18—2)

This invention relates to molds and more particularly to a device suitable for stripping molded articles from a mold core or a mold cavity.

An important object of this invention is to provide a device adaptable for use in association with a mold core or mold cavity for delivering pressure fluid against or into an article molded thereby to strip the same from the core or cavity and, immediately upon such stripping, to terminate the flow of fluid.

Another object of the invention is to provide a device of the above type wherein the mechanism for terminating the flow of fluid is responsive to the pressure fluid used for stripping the article in such manner as to remain in open position until such time as the article is stripped and thereafter to move to closed position.

A further object of the invention is to provide a device having the above characteristics which is particularly adaptable for use with a plurality of mold cavities wherein a common fluid supply is directed to all of the cavities, the said device insuring maximum fluid pressure against each molded article by successively terminating the flow of fluid at each cavity upon stripping of the article associated therewith.

Generally, it is an object of this invention to provide a device as above set forth which is fast and positive in its action and highly durable in use.

Further objects of the invention and the invention itself will be readily apparent from the following specification and the accompanying drawings, in which said drawings:

FIG. 2 is a reduced, sectional view of the mold halves shown in open position with one mold core shown partially sectioned and showing the strippers in a different operative position;

FIG. 3 is a fragmentary showing of a modified fluid restriction member illustrated to the scale of FIG. 1;

FIG. 4 is a longitudinal section of a modified form of the stripper;

FIG. 5 is a transverse section taken along the line 5—5 of FIG. 4;

FIG. 6 is a transverse section taken along the line 6—6 of FIG. 4;

FIG. 7 is a transverse section taken along the line 7—7 of FIG. 4;

FIG. 8 is a longitudinal section of still another modified form of the stripper;

The stripping device of this invention is so placed in the mold or mold core as to provide for the introduction of pressure fluid between the article molded and that part of the mold to which the article adheres when the mold is opened, and the device is so constructed that when the article is stripped, reduction in pressure causes a valve to close and terminate the flow of fluid.

Figure 1:
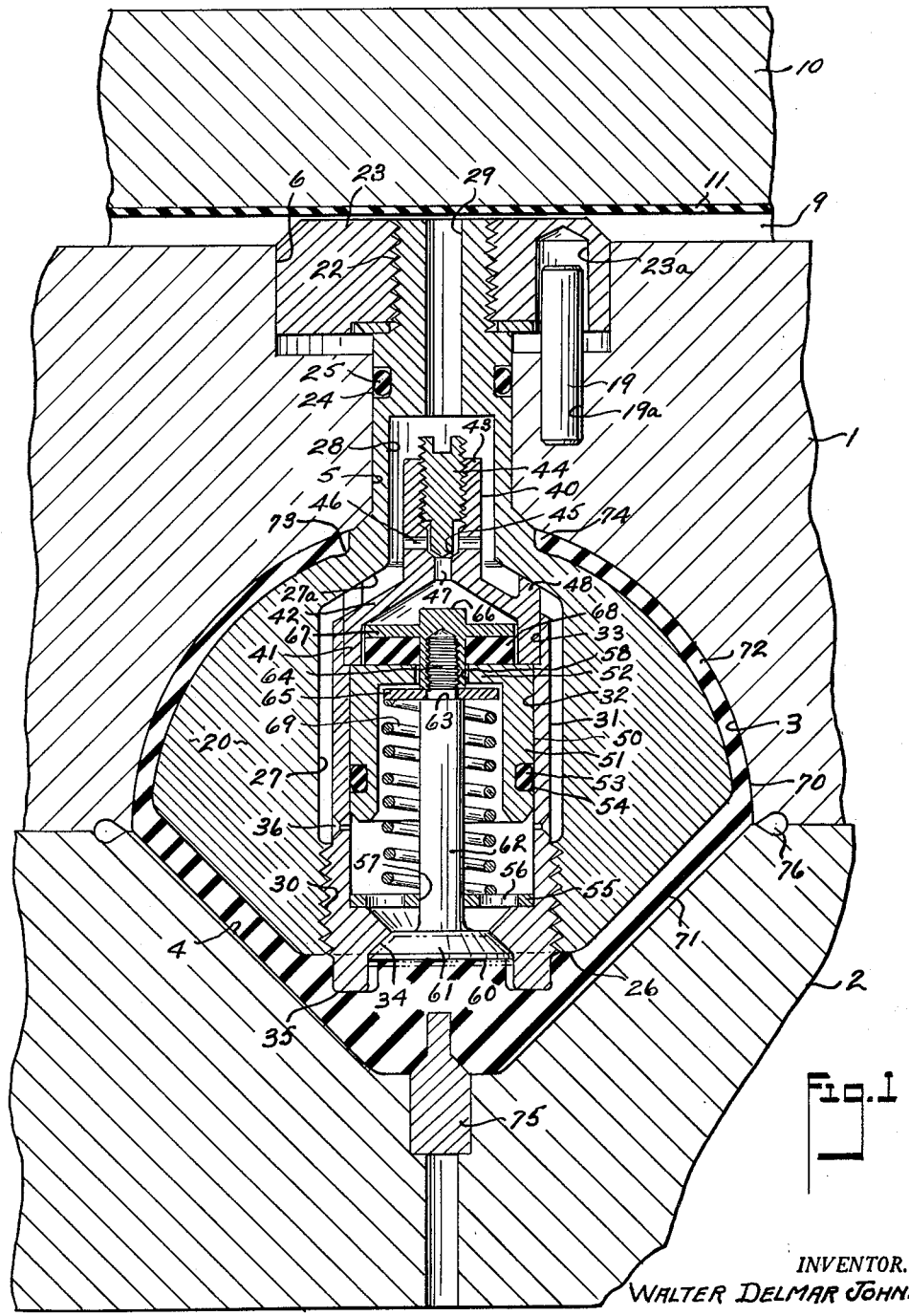
FIG. 1 is a longitudinal section through a mold incorporating the stripper of this invention and includes a fragmentary showing of the mold halves in closed position.

In the embodiment of FIG. 1 as herein illustrated and described, the apparatus of this invention is shown as adapted for the manufacture of tank balls, and it will be understood that the invention is readily adaptable for use in the manufacture and stripping of various types of articles. At 1 there is shown an upper, fixed mold half adapted to cooperate with a lower, movable mold half 2 which is movable toward and away from said fixed half and is brought into register therewith by means of guide pins 2a. It will be understood that conventional means (not shown) is provided whereby the movable mold half 2 is tightly closed upon the fixed mold half 1 during molding of the articles and that said movable mold half is subsequently moved away from said fixed mold half between each molding operation whereby the finished article may be ejected prior to the forming of a new article. Complementary recesses 3 and 4 are provided in the fixed and movable mold halves respectively which form a plurality of mold cavities of the shape desired when the mold is in a closed position.

Each recess 3 in the fixed mold half 1 intersects a coaxial bore 5 in said fixed mold half which has an enlarged concentric counterbore 6 adjacent the upper surface of said fixed mold half. A laterally disposed groove 9 is provided in the upper surface of the fixed mold half 1, said groove intersecting the counterbores 6 and extending laterally beyond said counterbores. A top plate 10 is disposed above the fixed mold half 1, and a sealing gasket 11 is interposed between said plate and the mold half. The fixed mold half, the top plate, and the gasket are all securely fixed together by any suitable means.

The fixed mold half 1 has an inlet passage 12 opening at one side of said mold half, said inlet passage connecting with the groove 9 by means of a vertical aperture 13. The inlet passage 12 has a tapped portion 12a at the mouth thereof adapted to receive a connector member 16 which is, in turn, connected to a suitable source of pressure fluid (not shown). It will be clearly understood from the foregoing that pressure fluid entering the inlet passage 12 is directed into the groove 9 of the fixed mold half to deliver pressure fluid behind all of the mold recesses 3.

A mold core 20 is mounted within each recess 3 of the fixed mold half 1 by means of a mold core stem 21 which is slidably fitted within a bore 5 and which extends upwardly into the associated enlarged counterbore 6. The mold cores 20 are all identical in form and detail, and the following description refers to that core shown on the right in FIG. 2 and enlarged in FIG. 1.

The upper end of the stem 21 has a reduced threaded portion 22 adapted to receive a circular core nut 23 which is a pistonlike fit within the counterbore 6. The outer periphery of the mold core stem 21 is circumferentially grooved at 24 to receive a resilient, sealing O-ring 25 which seals said stem to the inner peripheral wall of the bore 5.

As best shown in FIG. 1, the mold core 20 is of such size and is so shaped that a tank ball may be molded between said core and the interior wall surfaces of the molding cavity formed by the pair of recesses 3 and 4. The mold core 20 has an outer face 26 opposite the stem 21 which has an enlarged socket 27 therein which extends into said core a substantial distance and is coaxial with said stem. The inner end of the socket 27 has converging walls 27a which intersect a relatively smaller socket 28 extending upwardly into the stem 21 to about the midpoint thereof. A coaxially bored passage 29 of reduced dimensions intersects the smaller socket 28 and extends coaxially through to the upper end of the stem 21.

The mouth of the larger socket 27 adjacent the outer face 26 has an internally threaded portion 30 having thread fitted therein a sleevelike insert 31. The insert 31 extends upwardly into the socket 27 and is radially spaced from the inner walls of said socket, said insert providing an inner cylindrical bore 32 which is diametrically outwardly stepped adjacent its upper end as indicated at 33. The lower end of the insert 31 adjacent the outer face 26 provides a valve seat 34 and downwardly projecting, circumferentially spaced lugs 35 surrounding said valve seat whereby the insert may be engaged by a suitable tool for removing the same from the threaded portion 30.

The outwardly stepped portion 33 of the cylindrical bore 32 provides seating means for a needle valve seat 40 which has a cuplike lower end portion 41 which fits tightly within said step and affords an upwardly converging, circumferentially continuous wall 42 spaced from the similarly angled wall surfaces 27a. An internally threaded collar 43 extends upwardly from the converging wall 42 into the smaller socket 28 and has a needle valve 44 thread fitted therein. The lower end of the collar 43 provides a seat 45 for the needle valve 44 above which is provided a plurality of radially directed apertures 46 communicating with the interior of the lower end portion 41 below the wall 42 through a short vertical passage 47. The outer periphery of the wall 42 is provided with upwardly projecting lugs 48 which are spaced circumferentially around said periphery and bear upwardly against the interior wall surfaces 27a.

An inverted, cup shape sleeve valve 50 having a circumferentially continuous wall 51 and an upper end wall 52 is slidably and closely fitted within the cylindrical bore 32 of the insert member 31. The sleeve valve 50 is sealed relative to the cylindrical bore 32 by means of a resilient, heat resistant O-ring 53 disposed within a circumferential groove 54 in the outer surface of the circumferential wall 51. Said sleeve valve is vertically slidable between an upper position wherein the upper surface thereof abuts the lower edge of the lower end portion 41 and a lowermost position wherein it abuts an apertured stop plate 55 which has a plurality of apertures 56 therein and which is seated at the bottom of the cylindrical bore 32 in slightly spaced relation above the valve seat 34.

A poppet type valve 60 is concentrically positioned within the cylindrical bore 32 and has a valve head 61 adapted to cooperatively engage the valve seat 34 thereby closing the lower end of the insert 31. A valve stem 62 projects upwardly through an aperture 57 in the center of the stop plate 55, the upper end portion of said valve stem providing a circumferential shoulder 63 and an upwardly projecting, reduced threaded portion 64. The shoulder 63 is disposed below the end wall 52 and seats thereon a washer 65. A cylindrical pressure nut 66 is thread fitted upon the threaded portion 64 and bears downwardly against the washer 65 thereby securing it in place. Said pressure nut projects through a concentric aperture 58 in the end wall 52 and has adjacent its upper end a radially projecting, circumferentially continuous flange 67 which is positioned within the lower end portion 41 of the needle valve seat 40 and is spaced upwardly above the upper surface of the end wall 52. A resilient washer 68 having substantial thickness and being manufactured of a suitable heat resisting material such as silicon rubber is interposed between and bonded to the flange 67 and the end wall 52, said resilient washer allowing limited movement between the sleeve valve 50 and the poppet type valve 60 and also acting as a seal between the upper end of said poppet type valve and said sleeve valve.

A coil type spring 69 is telescoped over the valve stem 62 and is compressively interposed between the washer 65 and the stop plate 55 whereby the poppet type valve 60 is normally biased toward the closed position with the head 61 thereof resiliently abutting the valve seat 34. The washer 65 also holds the sleeve valve 50 in a normally uppermost position above radially disposed apertures 36 in the walls of the insert 31 just above the threaded portion 30.

The mold core is prevented from rotating within the recess 3 by means of a pin 19 which is seated within a socket 19a in the bottom of the counterbore 6 and projects upwardly into and loosely interfits a socket 23a in the lower surface of the core nut 23. The pin 19 interfits the socket 23a in such manner as to allow free vertical movement of the core nut 23 relative thereto.

The mold as herein illustrated is adapted for the manufacture of a tank ball 70 having a frusto-conical wall 71 formed in the movable mold half 2 integrally connected to a domelike wall 72 formed by the fixed mold half 1. The wall 72 is centrally apertured in the area where the mold core stem 21 passes therethrough, and the mold core 20 is here provided with a circumferential groove 73 which forms an annular bead 74 around the aperture in the wall 72. The movable mold half 2 additionally provides a supplemental molding member in the form of a locator pin 75 which locates a threaded spud insert (not shown) in the area of convergence of the frusto-conical wall 71 whereby the tank ball is adapted to receive a suitable suspending member. An annular overflow cavity 76 is provided around the mold cavity at the parting line of the mold when said molds are in closed position.

In ordinary use, pressure fluid from a single source is applied simultaneously to all of the molds by means of the groove 9 (FIG. 2). As hereinlater described in detail, the pressure fluid thus applied will enter each of a plurality of articles molded upon the cores with sufficient pressure to cause said articles to be ejected or stripped from their respective cores. The mechanism of this invention so operates that if one article is ejected before any of the others, the valve in the core associated therewith automatically and immediately closes thereby assuring that full pressure will be delivered against the remaining articles.

In operation, the mold halves are separated after the molding of the tank ball or similar article after which pressure fluid is applied to the passages 12 and 13, and, consequently, to the groove 9. Such pressure fluid first acts upon each core nut 23 due to its large upper surface area and causes it to move downwardly through the associated cylindrical counterbore 6 to the bottom thereof. This causes the mold core 20 to move away from the recess 3 thereby freeing the domelike wall 72 and the annular bead 74 whereby the tank ball may be ejected (FIG. 2). This movement eliminates friction between the outer surface of the article and the recess 3 during the stripping and also allows sufficient space for the reinforcing bead 74 to pass between the core 20 and the fixed mold half 1.

Simultaneously with the above movement, the pressure fluid is applied to the passage 29 (FIG. 1) from which it enters the smaller socket 28 and the relatively larger socket 27. Fluid enters through the apertures 46 and the aperture 47 whereby it pressurizes the space within the lower end portion 41 and the converging wall 42 which provides a pressure chamber for the upper end of the poppet type valve 60. At the same time fluid is entering through the apertures 36 beneath the sleeve valve 50 within the cylinder bore 32 which provides a chamber beneath said sleeve valve. The needle valve 44 will be generally adjusted to retard the pressurizing of the upper chamber thereby allowing the lower chamber to be pressurized slightly ahead of said upper chamber. However, both said chambers may be pressurized simultaneously.

It will be clearly seen from the foregoing that the fluid pressure in both the upper and lower chambers will act upon the poppet type valve 60 tending to open it, and this pressure is sufficient to overcome the resistance of the spring 69. But the pressure in the lower chamber will also effect an upward force against the sleeve valve 50 thereby tending to hold it in its uppermost or open position. The tendency of the valve 60 to open is thereby partially counteracted by the tendency of the sleeve valve 50 to remain open since said poppet type valve cannot move downwardly all the way without also moving the sleeve valve downwardly and thereby closing it. However, the resilient washer 68, being compressible, allows relative movement between the poppet valve and the sleeve valve whereby said poppet valve partially opens (as shown in broken line, FIG. 1) in response to the pressurizing of the upper chamber without closing the sleeve valve 50. The connection between the valve stem 62 and the sleeve valve 50 may be made solid, and partial opening of the poppet type valve 60 will still be effected without closing said sleeve valve. However, the resilient seal or washer 68 assures a greater initial opening of the poppet type valve and, consequently, a faster and more positive action of the stripping movement.

As the valve head 61 moves downwardly, it exerts a pushing effort upon the tank ball 70 and also allows the pressure fluid to escape past the seat 34 to begin pressurizing the interior of said tank ball. Under influence of the pressure fluid, the tank ball 70 is forced downwardly and the bead 74 and the wall 72 are stretched whereby they pass over the largest diameter of the core and the ball is stripped. As long as the tank ball 70 remains on the core 20, the interior of said tank ball and, therefore, the lower chamber will remain pressurized whereby the sleeve valve 50 will be maintained in its uppermost or open position. However, the instant that the tank ball is ejected from the core, there is a pressure drop in the lower chamber although the upper chamber remains relatively pressurized. This causes the poppet type valve 60 to move downwardly and carry with it the sleeve valve 60 until the lower edge of said sleeve valve abuts the stop plate 55 as shown in FIG. 2. This is sufficient travel to bring the seal 53 downwardly past the apertures 36 thereby blocking said apertures and terminating the flow of fluid into the lower chamber and, consequently, terminating all flow out of the mold core 20.

The fluid which is directed to the mold cores 20 for stripping the molded articles therefrom must be under sufficient pressure to insure rapid and positive stripping of the articles. For example, a pressure of substantially 100 p.s.i. has proved to be highly satisfactory in a molding apparatus of the type herein illustrated which is adapted for the manufacture of a standard 2½ inch tank ball. This pressure causes the operation of the stripping mechanism as above described to be effected with extreme rapidity whereby the sequential movements of the parts are not discernable to an observer. The result is rapid and efficient stripping of all of the articles due to the fact that the full effect of the pressure fluid is applied to every article in the mold regardless of the fact that one or more of said articles might lag behind the others during ejection.

It will be understood that the entire valve mechanism does not necessarily have to be mounted within the mold core itself. By giving the poppet type valve 60 an elongated stem, the sleeve valve and its associated parts can be positioned within the mold core stem 21 quite remotely from the molded article without decreasing the efficiency of the mechanism. Such would possibly be the method of installation in the case of mold apparatus for making articles having very thin body portions such as that found in conventional hot water bottles or the like.

FIG. 3 shows a modified part for replacing the needle valve seat 40 which would be seated within the radial step 33 and would replace said needle valve seat without any modification to any of the surrounding or associated parts. The modified member, indicated at 80, comprises a circular lower end portion 81 which closely fits within the step 33 and has a frusto-conical, upwardly converging wall 82 terminating in a horizontal, upper wall 83. Said upper wall is centrally apertured at 84 to provide a non-adjustable passageway into the upper chamber above flange 67. The modified member 80 is also provided with a plurality of upwardly directed lugs 85 at the periphery thereof whereby the converging wall 82 is maintained in spaced relation to the converging wall 27a.

A stripper mechanism according to this invention utilizing the modified member 80 in the place of the needle valve seat 40 operates in all respects in identically the same manner as that described above in connection with FIGS. 1 and 2. The modified form eliminates the adjustable feature of the needle valve and provides instead an aperture 84 of fixed dimension, such dimension being the optimum necessary in the particular application of the invention to which said modified member would be applied.

In the modification of the invention as shown in FIG. 4, the mold core is fragmentarily shown at 90 and is provided with a socket 91 the upper end of which is connected with the pressure fluid supply source in the manner described in connection with the first embodiment of the invention as illustrated in FIGS. 1 and 2. The socket 91 contains a cylindrical mold core insert 92 which is thread fitted within said socket over a portion of its length adjacent the lower end thereof as indicated at 93. The insert 92 has a concentric cylindrical bore 94 which is radially outwardly offset as indicated at 95 adjacent the upper end thereof in such manner as to provide seating means for a sleeve insert 96. The lowermost end of said insert 92 has a transverse wall 97 having a central opening so formed as to afford a valve seat 98 and downwardly open, circumferentially spaced notches 99 for receiving a suitable tool whereby the insert may be screwed into or out of the socket 91.

Above the valve seat 98, the transverse wall 97 provides a cylindrical bore 100 into which is slidably fitted a stem 101 of a poppet type valve 102. Said poppet type valve has a head 103 adjacent the lowermost end thereof adapted to close upon the valve seat 98, the upper end of the valve stem 101 having a reduced portion 104 which is centrally tapped at 105. The upper end of the cylindrical bore 94 houses an upper valve member 106 having a body portion 107 which is centrally bored at 108 and counterbored at 109 adjacent the lowermost end thereof whereby it seats upon and telescopes over the reduced portion 104 of the valve stem 101. A bolt 110 projects downwardly through the central bore 108 and is thread fitted within the tapped valve stem at 105 whereby said valve stem and the upper valve member 106 are rigidly secured together. A resilient valve closure member 111 surrounds the reduced portion 104 and is interposed between the lower end of the body portion 107 and the shoulder formed by said reduced portion adjacent the upper end of the valve stem 101. The valve closure member 111 is diametrically larger than the valve stem 101 and is so formed at its outer periphery to complementarily interfit an arcuately formed valve seat 112 which is disposed immediately above the cylindrical bore 100 of the transverse wall 97.

The outer peripheral surface of the body portion 107 is radially spaced from the cylindrical bore 94 and is provided, intermediate the ends thereof, with an integrally formed piston 113 which closely but slidably interfits said cylindrical bore 94. Above the piston 113, the normal diameter of the body portion 107 slidably and closely interfits the sleeve insert 96.

The head of the bolt 110 is disposed within a counterbore 114 in the upper end of the body portion 107, said upper end being slotted in an axial direction to the depth of said counterbore in such manner as to provide a plurality of arcuately shaped segments 115 surrounding the bolt 110 and being circumferentially spaced from each other. The depth of the counterbore 114 and the slots between the segments 115 is such that the bottom thereof is disposed above the bottom of the sleeve insert 96 when the modified stripper is in the position as shown in FIG. 4.

As best shown in FIG. 6, the upper valve member 106 has a plurality of longitudinal slots 116 which extend above and below and cut through the piston 113. The slots 116 penetrate the outer periphery of the body portion 107 but terminate in an upward and downward direction a substantial distance below the bottom of the counterbore 114 and above the valve closure member 111 respectively.

Referring now to FIG. 7, the outer periphery of the valve stem 101 is provided with a plurality of circumferentially disposed flats 117 which extend vertically from the valve head 103 upwardly above the valve seat 112 and which afford fluid passage means past the valve stem 101 through the cylindrical bore 100.

The operation of the embodiment of FIG. 4 is similar to that of the first embodiment of the invention. Pressure fluid is applied to the top of the socket 91 and exerts a pressure upon the upper end of the body portion 107 forcing it downwardly and thereby moving the valve head 103 downwardly against the molded article indicated at A. Said valve head is thereby unseated, and when the upper valve member 106 moves downwardly a sufficient distance to bring the segments 115 below the lower end of the sleeve insert 96, the pressure fluid passes between said segments downwardly through the slot 116 and into the article past the valve seat 98. The pressure on either side of the piston 113 tends to equalize due to the pressure fluid trapped within or behind the article A whereby the poppet type valve remains open but the upper valve member 106 is temporarily prevented from closing. When the article A is stripped from the mold core 90, the sudden drop in pressure below the piston 113 causes said piston and the associated parts to move rapidly downwardly whereby the valve closure member 111 seats firmly upon the valve seat 112 to terminate the flow of fluid through the stripper. A coiled spring 118 is interposed between the piston 113 and the transverse wall 97 to assist in restraining the upper valve member 106 against closing before the article A is stripped and also for the purpose of again closing the poppet type valve 102 when the pressure fluid is cut off.

In the embodiment of FIG. 8, the mold core is shown at 120, said mold core having a socket 121 in fluid communication with an inlet passage 122 adjacent the upper end of said socket. An insert 123 fits within the socket 121 and has a threaded portion 124 adjacent its lower end which is thread fitted within the socket 121. The bottom of the insert 123 has a transverse wall 125 providing a valve seat 126 and having an upwardly projecting collar 127 which projects upwardly into a cylindrical bore 128 of said insert and is itself centrally bored at 129. The lower end of the insert 123 has circumferentially spaced, depending lugs 130 adapted to receive a suitable tool for screwing the insert 123 into or out of the socket 121.

The upper end of the insert 123 has a closure member 131 welded or otherwise suitably secured thereto, said closure member having a plurality of apertures 132 therein. The inlet passage 122 has a counterbore 133 adjacent the socket 121 of such diameter as to be in fluid communication with the apertures 132.

The valve seat 126 seats a head 134 of a poppet type valve 135, said poppet type valve having a valve stem 136 which projects upwardly and slidably interfits the bore 129 and has an upwardly projecting, threaded member 137 projecting upwardly from the upper end thereof.

An upper valve member 138 is positioned above the valve stem 136 and is provided in its lowermost end with a tapped bore 139 by means of which it is thread fitted upon the threaded member 137. The lowermost end of the upper valve member 138 also provides a diametrically reduced portion 140 around which is seated a resilient closure member 141 formed in such manner as to be adapted to seat upon a valve seat 142 at the upper end of the collar 127.

The upper valve member 138 is diametrically smaller than the cylindrical bore 128 in which it is positioned, and the upper end thereof is provided with an integral piston 143 which radiates outwardly from said upper valve member and closely but slidably interfits said cylindrical bore 128. The poppet type valve 135 is normally urged into the closed position as shown in FIG. 8 by means of a coil spring 144 which is interposed between the piston 143 and the lower transverse wall 125.

The upper valve member 138 has a plurality of upwardly open sockets 145 which are radially spaced from the axis of said upper valve member and laterally communicate with the outer periphery thereof by means of lateral apertures 146 disposed below the piston 143.

In operation of the stripper of FIG. 8, pressure fluid is introduced through the inlet passage 122 and the apertures 132 of the closure member 131 and applied to the upper surface of the piston 143. The sockets 145 provide sufficient restriction of the fluid to cause the poppet type valve 135 to be moved sharply downwardly against the molded article A when the pressure fluid is initially applied. Pressure fluid which enters the sockets 145 passes through the lateral apertures 146 to pressurize the cylindrical bore 128 and apply pressure on the upper surface of the valve head 134 whereby the poppet type valve is opened sufficiently to pressurize the interior of the molded article A. When said article is stripped, the resulting sudden pressure drop beneath the piston 143 causes said piston to move downwardly thereby overcoming the upward bias of the spring 144 and causing the valve closure member 141 to contact and seal against the valve seat 142.

The valve closure members 111 and 141 are manufactured of a suitable heat resisting material such as silicon rubber or the like which will not lose its resilient characteristics when subjected to the elevated temperatures incident to the molding operation.

Figure 9:
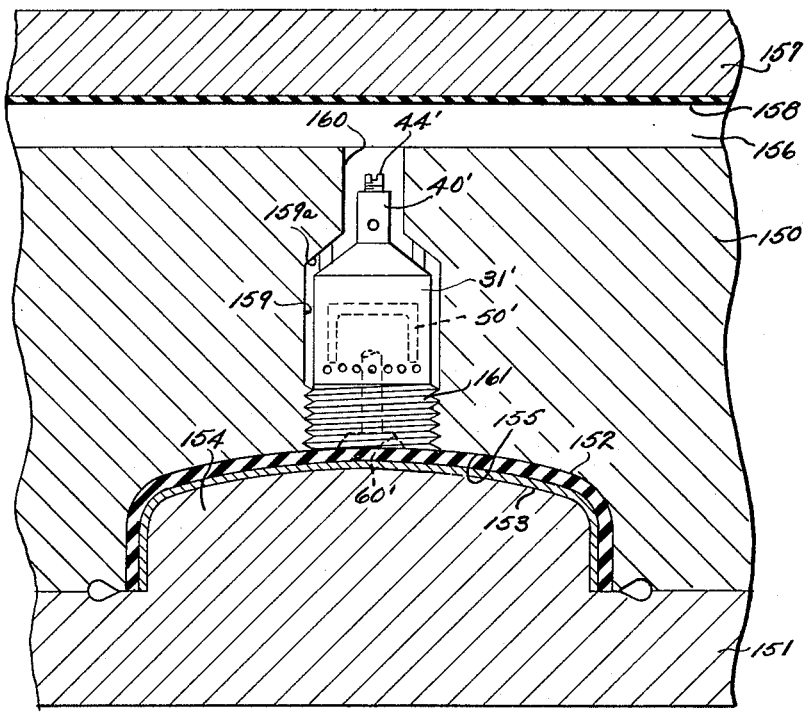
FIG. 9 is a sectional view of a mold with the stripper of this invention mounted therein.
Figure 10:
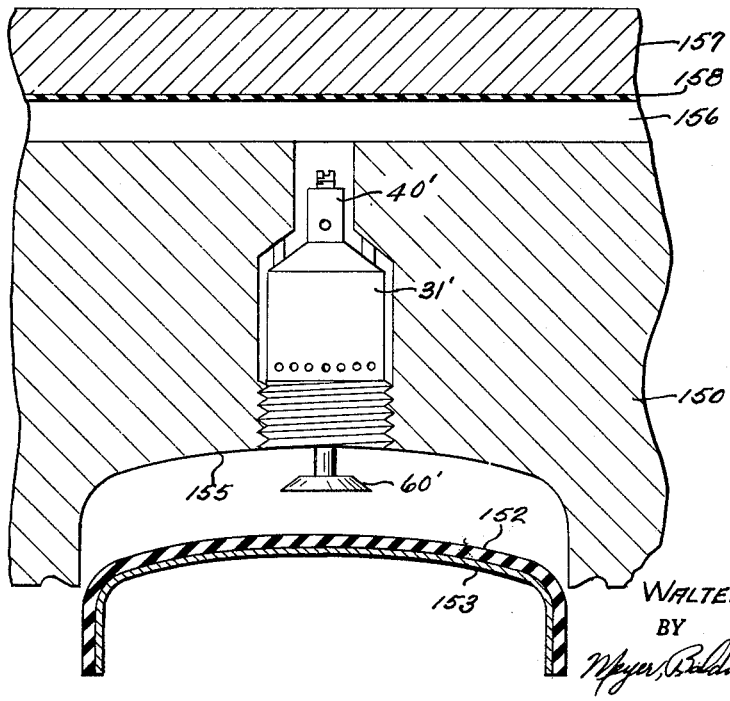
FIG. 10 is a view similar to FIG. 9 showing the stripper in a different operative position.

FIGS. 9 and 10 illustrate the manner in which the stripping device may be mounted within one of the mold halves for directing fluid against the outer surface of the article rather than against the inner surfaces of a hollow article. Such arrangement may be used where the molded article is solid or where for other reasons it is necessary to apply the stripping force to the outside surface of the article.

A fixed mold half is shown at 150 adapted to cooperate with a relatively movable mold half 151 for the molding of a resilient sheath or cover 152 upon the outer surface of a cup shaped metal cap metal 153. The cap member 153 is positioned upon a protuberance 154 of the movable mold half 151 which is so formed as to complementarily interfit said cap member, and the fixed mold half 150 is provided with a recess 155 which fits over the cap member and protuberance in such manner as to provide a mold cavity between the cap member and the fixed mold half for molding the cover 152. It will be understood that conventional means (not shown) is provided for moving the movable mold half 151 away from the fixed mold half for removal of the molded article.

The fixed mold half 150 is provided with a pressure fluid carrying groove 156 at the face thereof opposite the recess 155, said fixed mold half having a top plate 157 and an interposed gasket 158 covering and sealing the open side of said groove. A socket 159 having a tapered upper end wall 159a opens into the recess 155, said socket 159 having a threaded portion 161 adjacent said recess. A smaller socket 160 opens into the socket 159 through the tapered end wall 159a, said smaller socket also opening into the groove 156. A stripper valve mechanism of the type shown in FIGS. 1 and 2 is mounted within the socket 159, said mechanism comprising an insert 31', needle valve seat 40', needle valve 44', sleeve valve 50', and a poppet type valve 60'. It will be understood that the stripper valve mechanism shown in FIGS. 9 and 10 operates in the same manner and contains the same operative parts as that shown in FIGS. 1 and 2.

As illustrated in FIG. 10, after the cover 152 has been molded, the movable mold half 151 is moved away from the fixed mold half and pressure fluid is applied to the stripper valve mechanism through the groove 156 and the smaller socket 160. Said valve mechanism then directs the pressure fluid against the cover 152 through the poppet type valve 60' and the article is forcibly ejected from the recess 155. As the article leaves said recess, the sudden pressure drop in the area of the poppet type valve 60' causes said valve to fully open thereby closing the sleeve type valve 50' and terminating the flow of fluid as hereinbefore described.

Throughout the foregoing description the terms "upper" and "lower" have been used to clarify the relative positions and actions of the mold halves and their associated parts, and it will be understood that the use of such terms is not intended by way of limitation upon the scope of the invention as herein described and claimed. It is anticipated that the mold may be used in any desired position.

It will be understood that many other changes in the details of this invention as herein described and illustrated may be made without, however, departing from the spirit thereof or the scope of the appended claims.

What is claimed is:

1. In a stripping device for ejecting a molded article from a mold core, means providing a passage through a mold core; a poppet valve disposed in said passage having a head normally closing said passage; said head having a valve stem and a piston-like member on the distal end of said stem; a normally open sleeve valve carried adjacent and movable relative to said piston-like member between said head and said piston member; means defining a first chamber over said piston member and means defining a second chamber between said sleeve valve and said head, both said chambers being fluid connected with said passage; said sleeve valve being movable in said second chamber to close the fluid connection to said second chamber; means optionally supplying pressure fluid to said passage and pressurizing said chambers whereby said poppet valve is initially partially opened to eject an article from said core while said sleeve valve remains open due to the pressure in said second chamber after which said sleeve valve closes as said poppet valve fully opens and effects a pressure drop in said second chamber.

2. A mechanism as set forth in claim 1 wherein resilient means is provided between said piston member and said sleeve valve normally urging said poppet valve toward closed position.

3. A molding apparatus comprising separable mold halves recessed and providing a mold cavity when closed; a mold core mounted within the recess of one said mold half; means providing a passage through said core and opening at an outer face of said core; a valve having a head at one end closing the opening in said outer face and a stem disposed within said passage having a fluid pressure responsive flange at the other end thereof; said valve so responsive to pressure fluid applied to said passage as to move outwardly; a sleeve valve carried adjacent and movable relative to said flange outwardly of said flange; cylinder means encompassing said sleeve valve; means defining a first chamber inwardly of said flange; said cylinder means providing a second chamber outwardly of said sleeve valve; resiliently compressible means disposed between said flange and said sleeve valve; spring means biasing said sleeve valve and said first mentioned valve inwardly of said passage; means defining apertures to said chambers in communication with said passage and said sleeve valve being movable outwardly in said cylinder to close said apertures to said second chamber whereby when a molded article is on said core and pressure fluid is applied to said passage, fluid flows to both said chambers and said first mentioned valve is partially opened allowing fluid from said second chamber to enter and strip the article thereby effecting a pressure drop in said second chamber which allows said sleeve valve to move outwardly with said first valve and block the flow of fluid through said second chamber.

4. A molding apparatus as set forth in claim 3 wherein said core is movable away from the recess of the mold half to which it is mounted; and means moving said core away from that mold half prior to the stripping of an article from said core.

5. A molding apparatus as set forth in claim 3 wherein said core has a core stem; means providing an aperture through said mold at the center of the mold recess for receiving said stem; said stem slidable in said aperture; piston means provided at the distal end of said stem; means defining a chamber behind said piston means in fluid communication with the source of pressure fluid and said passage whereby when pressure fluid is applied to said last mentioned chamber, said core is moved outwardly away from the recess of the mold prior to the stripping of an article from said core.

6. A molding apparatus as set forth in claim 3 wherein the means defining an aperture to the upper chamber includes adjustment means for varying the rate at which said upper chamber receives the pressure fluid.

7. A molding apparatus as set forth in claim 3 wherein the means defining an aperture to the upper chamber comprises a needle valve adjustable to vary the rate at which said upper chamber is pressurized.

8. A molding apparatus as set forth in claim 3 wherein the recited resiliently compressible means comprises a washer of silicon rubber bonded to said flange and said sleeve valve.

9. A molding apparatus as set forth in claim 3 wherein the means defining an aperture to the upper chamber affords a fixed opening to said chamber for determining the rate at which said upper chamber receives the pressure fluid.

10. In a stripping device for ejecting a molded article from a mold core, means providing a passage through a mold core; an insert member removably mounted within said passage; a poppet valve disposed in said insert member having a head normally closing said passage; said head having a valve stem and a pistonlike member on the distal end of said stem disposed inwardly of said insert member; a normally open sleeve valve carried outwardly of and adjacent to said piston member; means affording limited movement between said piston member and said sleeve valve; means defining a first chamber over said piston member and means defining a second chamber between said sleeve valve and said head, both said chambers being fluid connected with said passage; means optionally supplying pressure fluid to said passage said sleeve valve being movable in said second chamber to close the fluid connection to said second chamber; and pressurizing said chambers whereby said poppet valve is initially partially opened to eject an article from said core after which said sleeve valve closes and said poppet valve fully opens as a result of the pressure drop in said second chamber.

11. A stripping device for stripping a hollow molded article comprising a core upon which the article is molded; means providing a passageway through said core to a face thereof disposed within said article; means optionally supplying a pressure fluid to said passageway; an insert member removably mounted within said passageway adjacent to the article; said insert member containing a first valve controlling the flow of fluid through said passageway; resilient means normally biasing said first valve to a closed position, said first valve partially opening in response to the fluid pressure to allow fluid to act against the article, a second valve; said resilient means normally biasing said second valve to an open position, said second valve being movable to a closed position to stop the flow of fluid through said first valve; compressible means interconnecting said first valve and said second valve whereby further opening of said first valve substantially coincides with closing of said second valve; means defining a chamber between said second valve and said first valve; means providing a passage from said passageway into said chamber whereby pressure fluid fills said chamber, the pressure fluid in said chamber holding said second valve open until the article is ejected after which said second valve closes in response to a pressure drop in said chamber.

12. A stripping device for stripping a hollow molded article comprising a core upon which the article is molded; means providing a passageway through said core to a face thereof disposed within said article; means optionally supplying a pressure fluid to said passageway; an insert member removably mounted within said passageway adjacent to the article; said insert member containing a first valve adjacent to said face controlling the flow of fluid through said passageway; resilient means normally biasing said first valve to a closed position, said first valve partially opening in response to the fluid pressure to allow fluid to act against the article; a second valve disposed in said passageway ahead of said first valve inwardly of said face; said resilient means normally biasing said second valve to an open position, said second valve being movable to a closed position to stop the flow of fluid through said first valve; compressible means interconnecting said first valve and said second valve whereby further opening of said first valve substantially coincides with closing said second valve; means providing a chamber between said second valve and said first valve; means providing a passage from said passageway into said chamber whereby pressure fluid fills said chamber; fluid restriction means disposed in said passageway ahead of said second valve and restricting the flow of fluid acting upon said second valve, the fluid pressure in said chamber holding said second valve open until the article is ejected after which said second valve closes in response to the pressure drop in said chamber when the article is ejected

References Cited by the Examiner
UNITED STATES PATENTS 2,959,818   11/60   Diehl et al. _____ 18—2 XR MICHAEL V. BRINDISI, *Primary Examiner.*

WILLIAM J. STEPHENSON, ROBERT F. WHITE,
*Examiners.*